(12) United States Patent
Rider et al.

(10) Patent No.: US 10,957,194 B2
(45) Date of Patent: Mar. 23, 2021

(54) ROAD HAZARD COMMUNICATION

(71) Applicant: INTEL CORPORATION, Santa Clara, CA (US)

(72) Inventors: Tomer Rider, Naahryia (IL); Aviv Ron, Klachim (IL); Yair Giwnewer, Tai-El (IL)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 15/786,208

(22) Filed: Oct. 17, 2017

(65) Prior Publication Data

US 2018/0286234 A1 Oct. 4, 2018

Related U.S. Application Data

(63) Continuation of application No. 14/368,321, filed as application No. PCT/US2013/077641 on Dec. 24, 2013, now Pat. No. 9,792,817.

(51) Int. Cl.
*G08G 1/09* (2006.01)
*G08G 1/0967* (2006.01)
(Continued)

(52) U.S. Cl.
CPC ... *G08G 1/096775* (2013.01); *G01C 21/3415* (2013.01); *G01C 21/3658* (2013.01);
(Continued)

(58) Field of Classification Search
CPC .. G08G 1/096775; G08G 1/166; G08G 1/165; G08G 1/04; G08G 1/162;
(Continued)

(56) References Cited

U.S. PATENT DOCUMENTS 6,188,957 B1 2/2001 Bechtolsheim et al.
2004/0107042 A1 6/2004 Seick
(Continued)

FOREIGN PATENT DOCUMENTS

KR 10-2013-0077671 A 7/2013

OTHER PUBLICATIONS

International Search Report and Written Opinion in related Internatonal Application No. PCT/US2013/077641, dated Sep. 24, 2014, 20 pages.
(Continued)

*Primary Examiner* — Michael V Kerrigan
(74) *Attorney, Agent, or Firm* — Schiff Hardin LLP

(57) ABSTRACT

Apparatus, systems, and/or methods may involve reporting a road hazard. Road hazard data may be collected for an object on a road, which may include automatically generated data from a device associated with the object causing a hazard. The road hazard data may be provided to a service, an application, a device, a client, and so on. For example, the road hazard data may be merged with a map and provided to a map services client, a navigation client, and so on. An alert may be generated based on the road hazard data to warn of the hazard caused by the object. The alert may include a visual and/or audio representation of the hazard data. The alert may be used to automatically and/or manually avoid the hazard.

29 Claims, 6 Drawing Sheets

(51) Int. Cl.
*G08G 1/04* (2006.01)
*G08G 1/0962* (2006.01)
*G08G 1/0968* (2006.01)
*G08G 1/16* (2006.01)
*G01C 21/34* (2006.01)
*G01C 21/36* (2006.01)

(52) U.S. Cl.
CPC ............ *G01C 21/3697* (2013.01); *G08G 1/04* (2013.01); *G08G 1/0962* (2013.01); *G08G 1/096716* (2013.01); *G08G 1/096758* (2013.01); *G08G 1/096811* (2013.01); *G08G 1/162* (2013.01); *G08G 1/164* (2013.01); *G08G 1/165* (2013.01); *G08G 1/166* (2013.01)

(58) Field of Classification Search
CPC ....... G08G 1/096811; G08G 1/096758; G08G 1/096716; G08G 1/0962; G08G 1/164; G01C 21/3697; G01C 21/3658; G01C 21/3415
See application file for complete search history.

(56) References Cited

U.S. PATENT DOCUMENTS

| | | |
|---|---|---|
| 2004/0138809 A1 | 7/2004 | Mukaiyama |
| 2005/0065715 A1* | 3/2005 | Watanabe ............. G01C 21/26 701/517 |
| 2009/0072997 A1* | 3/2009 | Shrum, Jr. ............ G08G 1/205 340/905 |
| 2010/0164752 A1* | 7/2010 | Stahlin ............ G08G 1/096716 340/905 |
| 2010/0267379 A1* | 10/2010 | Stahlin ............ G08G 1/096716 455/426.1 |
| 2012/0229301 A1 | 9/2012 | Goodwin |
| 2012/0229302 A1 | 9/2012 | Sri-Jayantha |
| 2012/0270558 A1 | 10/2012 | Busch et al. |
| 2013/0144490 A1 | 6/2013 | Lord et al. |
| 2015/0145698 A1* | 5/2015 | Werner ............... H05B 47/185 340/928 |

OTHER PUBLICATIONS

International Preliminary Report on Patentability in related International Application No. PCT/US2013/077641, dated Jul. 7, 2016, 16 pages.

KENT: "Here shares how automated cars can 'heal' maps on the fly", retrieved from https://360.here.com/2015/06/23/here-sensor-data-ingestion, edited Jun. 23, 2015, 7 pages.

"HERE Hazard Warnings", HERE, retrieved from https://www.here.com/en/products-services/products/connected-vehicle-services/here-hazard-warnings, 7 pages.

* cited by examiner

ROAD HAZARD COMMUNICATION

BACKGROUND

Embodiments generally relate to road hazard reporting. More particularly, embodiments relate to communication of a road hazard (e.g., generating, collecting, and/or providing road hazard data for an object on a road), which may be used to generate an alert to warn approaching traffic.

A hazard platform may require user input to report a road hazard to other users. For example, the user may be required to launch an application and manually report a hazard, such as an accident, a parked off-road vehicle, and so on. Thus, the hazard platform may cause a dangerous condition and/or create complexity by, for example, diverting a user's attention from the road to input data, requiring the user to stop and input the data, delaying the reporting of the hazard, relying on user credibility, and so on. In addition, the hazard platform may not be capable of reporting data for a moving object causing a road hazard, such as a bicycle.

BRIEF DESCRIPTION OF THE DRAWINGS

The various advantages of embodiments will become apparent to one skilled in the art by reading the following specification and appended claims, and by referencing the following drawings, in which:

DETAILED DESCRIPTION

Figure 1A:
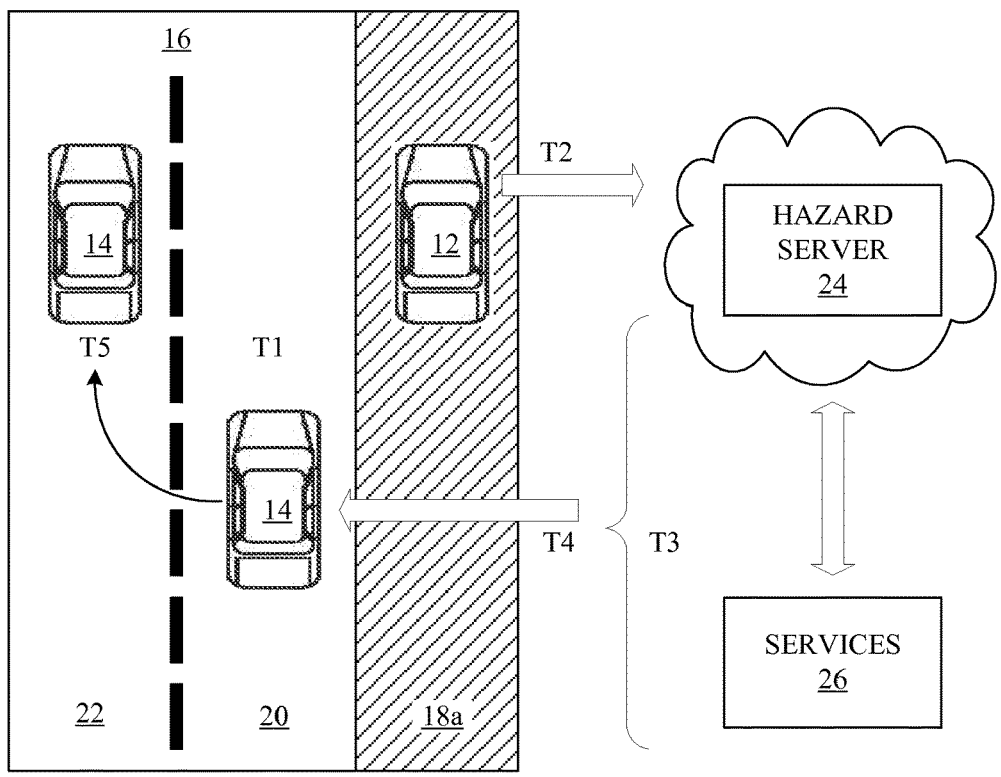
FIGS. 1A and 1B are block diagrams of an example approach to communicate a road hazard according to an embodiment.
Figure 1B:
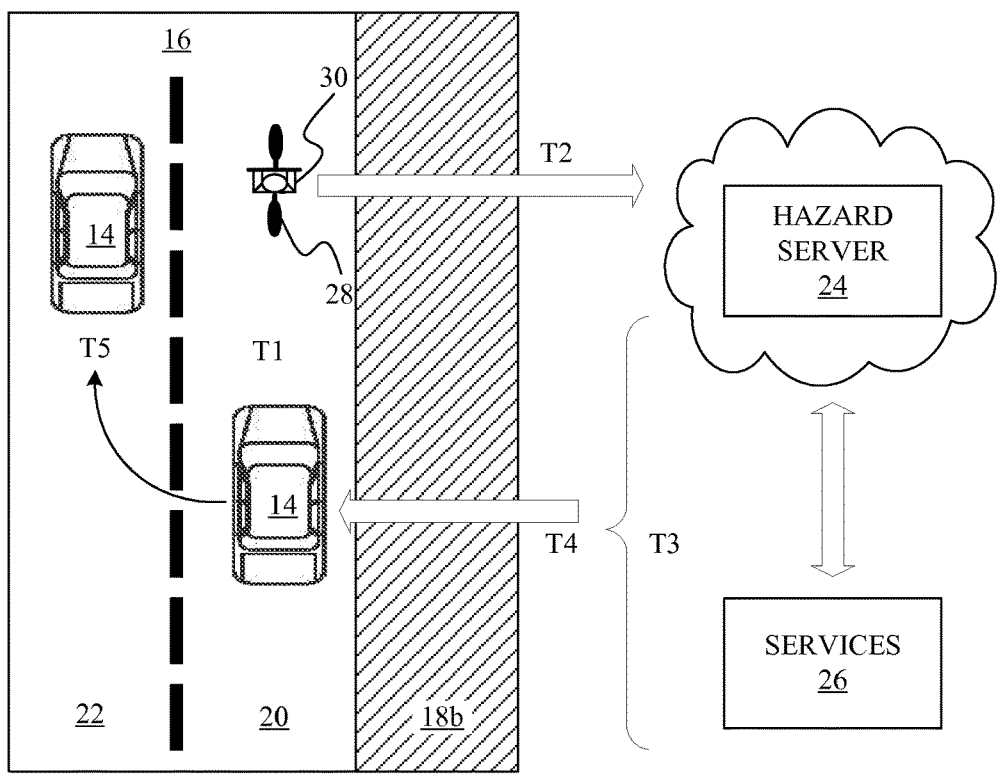

FIGS. 1A and 1B show an approach to communicate a road hazard according to an embodiment. In the illustrated example of FIGS. 1A and 1B, two or more objects such as vehicles 12, 14 travel in the same direction on a road 16. The vehicles 12, 14 may include any type of vehicle such as, for example, an automobile (e.g., car, bus, etc.), a motorcycle, a truck (e.g., a cargo truck, a fire truck, pickup truck, etc.), and so on, or combinations thereof. In addition, the road 16 may include any type of road such as, for example, a highway (e.g., an interstate road, a route, an expressway, etc.), a street (e.g., a city street, a town street, a village street, etc.), and so on, or combinations thereof. The road 16 may include one or more lanes such as, for example, an emergency lane on a side of the road 16 where vehicles may temporarily park, a traffic lane where vehicles may travel, a walk lane where pedestrians may travel, and so on, or combinations thereof.

In the illustrated example of FIG. 1A, the road 16 includes a highway with an emergency lane 18a and two or more travel lanes 20, 22. At time T1, the vehicle 12 veers to a side of the road 16 and is parking in the emergency lane 18a. Thus, the vehicle 12 causes a hazard on the road 16, which may include any event, state, etc., that is hazardous and/or dangerous to traffic on the road 16. For example, the hazard may include an event by the vehicle 12 on the road 16 such as slowing to a dangerous velocity, parking in the emergency lane 18a, exiting the emergency lane 18a, and so on, or combinations thereof. The hazard may also include a state of the vehicle 12 on the road 16 such as being parked in the emergency lane 18a, utilizing hazard lights, having a mechanical or electrical failure, and so on, or combinations thereof. Thus, at time T1, the vehicle 14 in the travel lane 20 approaches the hazard caused by the vehicle 12.

A device associated with the vehicle 12 may report the hazard. The device may be associated with the vehicle 12 using, for example, an authentication mechanism (e.g., username, profile, encryption keys, etc.), an address (e.g., mobile internes device address, internet protocol address, media access control address, etc.), a connection (e.g., a WiFi connection, a Bluetooth connection, a cellular connection, etc.), proximity to the vehicle 12 (e.g., located in the parked car, etc.), and so on, or combinations thereof. The device may include any computing device and/or data platform such as, for example, a laptop, personal digital assistant (PDA), wireless smart phone, media content player, imaging device, mobile Internet device (MID), any smart device such as a smart phone, smart tablet, smart TV, wearable computer, and so on, or any combination thereof. In one example, the device may include a mobile computing device of a vehicle user such as, for example, a smart phone of a driver of the vehicle 12, of a passenger in the vehicle 12, and so on, or combinations thereof. In another example, the device may include any on-board computing system integral with and/or mechanically removable from the vehicle 12 such as, for example, an in-vehicle infotainment (IVI) system, a navigation system, a vehicle computer system, and so on, or combinations thereof.

The device associated with the vehicle 12 may include a display, an output to a display, and so on, or combinations thereof. For example, the device associated with the vehicle 12 may include a touch screen, a liquid crystal display (LCD), a light emitting diode (LED) display, a projection display, and so on, or combinations thereof. The device associated with the vehicle 12 may also include an output to the display such as a windshield display, a mirror display, an eye glass display, and so on, or combinations thereof. In addition, the display may include a two-dimensional (2D) display, a three-dimensional (3D) display, and so on, or combinations thereof. In one example, the display may be used to manually input data related to a hazard setting (e.g., continually report hazard data, etc.), to manually input the road hazard data, and so on, or combinations thereof. In addition, the device may include an audio component such as a microphone to, for example, verbally input data. Moreover, the device associated with the vehicle 12 may include an input from an audio component, such as a microphone of the vehicle 12.

The device associated with the vehicle 12 may automatically generate and/or provide road hazard data for the vehicle 12. The road hazard data may include accelerometer data (e.g., velocity, acceleration, deceleration, etc.), gyroscope data (e.g., movement, elevation, etc.), global positioning data (e.g., global position, location on the road, etc.), and so on, or combinations thereof. In one example, the acceleration data may be used to indicate a dangerous speed of the vehicle 12, a trajectory toward the emergency lane 18a, etc., the gyroscope data may be used to indicate a parked state, an angled state (e.g., being towed, changing tire, etc.), etc., the global positioning data may be used to indicate the position of the vehicle 12 on the road 16, and so on, or combinations thereof. The road hazard data may also include hazard feature data for the vehicle 12. For example, the hazard feature data may include data indicating that hazard lights of the vehicle 12 are utilized (initiated, operated, etc.), data indicating that a turn signal of the vehicle 12 is utilized, data indicating that a check engine light of the vehicle 12 is utilized, and so on, or combinations thereof.

The device associated with the vehicle 12 may generate the road hazard data using a local component. For example, the device associated with the vehicle 12 (e.g., a mobile computing device, an IVI system, a navigation system, a vehicle computer system, etc.) may utilize a local device processor, memory, storage, global positioning system (GPS), and so on, or combinations thereof. In addition, the device associated with the vehicle 12 may utilize a component of another system associated with the vehicle 12 to generate the road hazard data. For example, a mobile computing device associated with the vehicle 12 may interact with a vehicle computer system to utilize an on-board vehicle processor, memory, storage, GPS, and so on, or combinations thereof. Thus, for example, the mobile computing device associated with the vehicle 12 may utilize a local GPS and an on-board vehicle processor or memory to obtain acceleration data, deceleration data, vehicle speed data, vehicle stopped state data, vehicle elevation state data, vehicle location data, hazard lights utilization data, mechanical or electrical failure data, and so on, or combinations thereof.

In the illustrated example of FIG. 1A, the device associated with the vehicle 12 may provide the road hazard data to a hazard server 24 at time T2. The device associated with the vehicle 12 may be registered with the hazard server 24, and/or may forward the road hazard data to the server 24 using, for example, an authentication mechanism (e.g., username, profile, encryption keys, etc.), an address (e.g., mobile internet device address, internet protocol address, media access control address, etc.), a connection (e.g., a WiFi connection, a Bluetooth connection, a cellular connection, etc.), proximity to the vehicle 12 (e.g., in the parked car, etc.), and so on, or combinations thereof. Thus, the hazard server 24 may receive and/or collect data that may be automatically generated from the device associated with the vehicle 12.

The road hazard data may be stored in any physical or virtual location of the hazard server 24 such as, for example, server memory, cache, hard drive, database, table, library, and so on, or combinations thereof. The road hazard data may be stored in the same server, may be distributed across two or more servers in the same or different physical and/or virtual location, and so on, or combinations thereof. Thus, the hazard server 24 may include a cloud-computing server.

The hazard server 24 may include an interface to provide the road hazard data and/or an alert based on the road hazard data. In one example, the interface may include an application programming interface (API) to allow access to the road hazard data from, for example, a service, an application, a device, and so on, or combinations thereof. The API may allow for any type of access to the road hazard data and/or alert, such as push access (e.g., via a real-time update, periodic scheduled update, etc.), pull access (e.g., via real-time requests, periodic scheduled requests, etc.), and so on, or combinations thereof. In the illustrated example of FIG. 1A, a service 26 may access the road hazard data to integrate the road hazard data with a service, an application, a device, and so on, or combinations thereof. For example, the service 26 may include Google maps, Telemap, NavNGo, iGo, etc., which may provide a map service and/or a navigation service to be used by a client user interface (e.g., a client application, a client device, etc.). Thus, the service 26 may merge the accessed road hazard data with a map to provide additional capabilities for the map service and/or the navigation service such as, for example, to provide (e.g., transmit) a hazard alert including hazard detail (e.g., hazard summary, etc.). At time T3 in the illustrated example, the service 26 may access the road hazard data via the API of the hazard server 24 and merge the road hazard data with the map service and/or the navigation service that it provides to generate a map with an alert based on the road hazard data (e.g., a drop pin for the hazard on the map, etc.).

The hazard server 24 may also include a network interface to provide (e.g., transmit) the road hazard data and/or the alert directly to a client user interface (e.g., a client application, a client device, etc.), with or without the API of the hazard server 24. The network interface may allow for any type of access to the road hazard data and/or the alert, such as push access (e.g., via a real-time update, periodic scheduled update, etc.), pull access (e.g., via real-time requests, periodic scheduled requests, etc.), and so on, or combinations thereof. In one example, the m hazard server 24 may provide a service such as a tow-truck service (e.g., to tow vehicles), a law enforcement service (e.g., to respond to emergencies), a traffic warning service (e.g., to notify the public of hazardous events), a map service (e.g., to provide a map), a navigation service (e.g., to provide a navigation path), and so on, or combinations thereof. Thus, the hazard server 24 may integrate the road hazard data with the service, an application, and/or a device to directly provide the road hazard data and/or the alert to a client user interface of a client (e.g., a map client, etc.).

For example, the hazard server 24 may utilize an API of the service 26 to access a library to add capabilities to the service provided by the hazard server 24. Thus, the hazard server 24 may access a map library via the API of the service 26 (e.g., a map service) and merge the accessed data (e.g., the map) with the road hazard data to generate the alert (e.g., on the map) based on the road hazard data. In another example, the hazard server 24 may include a database of maps to create the map merged with the road hazard data and to generate the alert on the map based on the road hazard data. The hazard server 24 may also provide, for example, navigation data for a navigation service such as navigation paths, text-to-speech route data, traffic patterns, and so on, or combinations thereof. Thus, the map provided to a map client may incorporate navigation services in response to user input. At time T3 in the illustrated example, the hazard server 24 may integrate the road hazard data with a map service and/or a navigation service to generate a map with an alert based on the road hazard data (e.g., a drop pin for the hazard on the map, etc.).

The alert may include any visual representation and/or audio representation of the road hazard data. For example, the alert may include a point generated on a map to indicate a location of the hazard, a point generated on a map having a property to indicate a type of hazard (e.g., a specific color of the point to indicate parking), a point generated on a map having a property to indicate a type of object causing the hazard (e.g., a truck shape for a truck, etc.), a point generated on the map including hazard details (e.g., via an automatic pop-up window, a selectable pop-up window, etc.), a drop pin generated on the map, and so on, or combinations thereof. The alert may include an icon generated on a map such as, for example, an image associated with the object. The image may include a picture of the vehicle 12, a picture of the user associated with the vehicle 12 (e.g., a profile picture of the driver, of the passenger, etc.), a logo indicating a type of object (e.g., make of a vehicle, etc.), and so on, or combinations thereof.

The alert may be rendered independent of a map. For example, the alert may include a written summary of the event on a display having hazard details such as the object causing hazard, the distance to the hazard, and so on, or combinations thereof. The alert may be presented to approaching objects without a map using, for example, an electronic message board on a road, a text message application, and so on, or combinations thereof. In addition, the alert may be presented by a plurality of displays. For example, the alert may be simultaneously presented by a display of an IVI system, a navigation system, a smart phone, and so on. In one example, a display of an IVI system may render the alert on a map merged with the hazard while a display of a smart phone renders the alert via a text message. The alert may include audio data, such as a text-to-speech message, a chime sound, and so on, or combinations thereof. The alert may include a standalone alert, and/or may be simultaneously rendered with other alerts. Thus, an audio alert may be simultaneously rendered with a visual alert, another audio alert, and so on, or conations thereof.

At time T4, the hazard server 24 and/or the service 26 may provide the road hazard data to a device associated with the vehicle 14. For example, a map merged with the road hazard data may be provided to the device associated with the vehicle 14, an alert including hazard details independently of a map may be provided to the device associated with the vehicle 14, and so on. In another example, the service 26 may provide a map and the hazard server 24 may provide the road hazard data, the alert, and so on, or combinations thereof. Thus, the device associated with the vehicle 14 may include any computing device and/or data platform such as, for example, the same type of computing device and/or data platform associated with the vehicle 12. The device may include, for example, a mobile computing device of a vehicle user such as, for example, a smart phone of a driver of the vehicle 14, of a passenger in the vehicle 14, and so on, or combinations thereof. In another example, the device may include any on-board computing system which is integral with and/or mechanically removable from the vehicle 14 such as, for example, an in-vehicle infotainment (IVI) system, a navigation system, and so on, or combinations thereof.

Accordingly, the device associated with the vehicle 12 and the device associated with the vehicle 14 may be the same or different type of device including the same or different capabilities (e.g., audio/video functionality, hazard reporting, alert rendering, etc.). The device may be associated with the vehicle 14 using, for example, an authentication mechanism (e.g., username, profile, encryption keys, etc.), an address (e.g., mobile internet device address, internet protocol address, media access control address, etc.), a connection (e.g., a WiFi connection, a Bluetooth connection, a cellular connection, etc.), proximity to the vehicle 14 (e.g., in the parked car, etc.), and so on, or combinations thereof. In addition, the device associated with the vehicle 14 may receive the road hazard data from the hazard server 24 and/or the service 26 using, for example, an authentication mechanism, a connection, proximity to the vehicle 14, and so on, or combinations thereof.

Proximity between the vehicles 12, 14 may be utilized to implement a desired geographic and/or temporal scope for the road hazard data, the alert, and so on, or combinations thereof. In one example, the device associated with vehicle 12 may generate and provide the road hazard data within a predetermine time from the hazard event (e.g., start, end, etc.), the hazard server 24 may broadcast the road hazard data and/or the alert to any device within a predetermined distance to the vehicle 12, and/or the device associated with the vehicle 14 may render the road hazard data within a predetermined time based on, for example, velocity of the vehicle 14 and distance to the vehicle 12. In another example, the vehicle 14 may render the alert for a region of interest based on, for example, a navigation path selected by the user, a region selected by the user on a map, and so on, or combinations thereof. The settings to generate, provide, and/or render data may be accessed via a user interface such as, for example, a service user interface to configure a setting for the hazard server 24 and/or the service 26, a client user interface to configure a setting for the devices associated with the vehicles 12, 14 (or other devices), and so on, or combinations thereof.

The device associated with the vehicle 14 may include a display to render the road hazard data, the map integral with the road hazard data, the alert, navigation data, and so on, or combinations thereof. For example, the device associated with the vehicle 14 may render the road hazard data via a touch screen, an LCD, a LED display, a projection display, and so on, or combinations thereof. The device associated with the vehicle 14 may also include an output to the display such as a windshield display, a mirror display, an eye glass display, and so on, or combinations thereof. In addition, the display may include a 2D display, a 3D display, and so on, or combinations thereof. The device associated with the vehicle 14 may include an audio component, such as a speaker to render the alert in an audio representation. In addition, the device associated with the vehicle 14 may include an output to an audio component, such as a speaker of the vehicle 14.

The display may be used to manually input data related to a hazard setting such as, for example, to continually receive road hazard data, to receive road hazard data on request, to exclude/include objects (e.g., ignore parked cars when on street, focus on cyclists and not pedestrians when on street, etc.), to set a preference to receive alerts (e.g., based on time such as 5 minutes away, based on distance such as 5 miles away, ignore all, etc.) and so on, or combinations thereof. It should be understood that one or more settings may be automatically set and/or applied, for example based on current location, velocity, boundaries between types of roads, history analytics, and so on, or combinations thereof. In one example, a setting to include cyclists and exclude parked cars may be automatically applied based on history analytics when a vehicle crosses from a highway boundary to a street boundary. Moreover, it should be understood that a display used to render the alert may not be in direct relationship with the vehicle 14. For example, the display may include an electronic display located on the road 16 (e.g., electronic billboard display, etc.), a display of a device used to plan a trip or utilize a service not currently located in the vehicle 14, a display of another approaching vehicle, and so on, or combinations thereof.

The alert may cause the vehicle 14 to manually avoid the hazard caused by the vehicle 12 at time T5. For example, the driver of the vehicle 14 may view and/or hear the alert and manually switch the vehicle 14 from the lane 20 to the lane 22. In another example, the driver of the vehicle 14 may view and/or hear the alert and manually switch the vehicle 14 to an alternative path off of the road 16, which may be determined using on a map service, a navigation service, and so on, or combinations thereof. In addition, the alert may cause the vehicle 14 to automatically avoid the hazard caused by the vehicle 12 at time T5. For example, the device associated with the vehicle 12 may automatically switch the vehicle 14 from the lane 20 to the lane 22 when the vehicle 12 is controlled by a computer system, may automatically switch the path of the vehicle 14 to an alternative path off of the road 16, and so on, or combinations thereof.

Additionally, respective devices associated with the vehicles 12, 14 may include (and/or communicate with) any other components to communicate a hazard on the road 16. For example, the devices associated with the vehicles 12, 14 may include an image capture device to capture image data, wherein the image capture device may include a front-facing camera, a rear-facing camera, a 2D camera, a 3D camera, a night-vision camera, and so on, or combinations thereof. The captured image data may be utilized in an element recognition processes such as, for example, scale invariant feature transform (SIFT), compressed histogram of gradients (CHoG) descriptor, and so on, or combinations thereof. Thus, for example, a pair-wise element-matching process may match a query image against a database image to recognize an element (e.g., object, feature, landscape, etc.) in an image (e.g., a video, a frame of a video, a photograph, etc.). The process may include, for example, performing a pair-wise comparison on a short list of candidates most likely to match the query image.

Indexing of image elements may include known processes such as, for example, using approximate nearest neighbor search of SIFT descriptors with a best-bin-first strategy, a BoF model using a BoF codebook constructed by a K-means clustering of a training set of descriptors, using a codebook constructed including a hierarchical k-means clustering to create a vocabulary tree (VT), using a locally-sensitive hashing process, using any other tree-based processes, and so on. A geometric verification process may also be used to analyze the image data. For example, element location information in a query image and a database image may be used to confirm that element matches are consistent with a change in view point between the two images. Any known process may be used to perform geometric verification. For example, a regression process such as random sample consensus may be used, checks based on feature-orientation information may be used, re-ranking before the regression process may be used, and so on.

The element recognition process may be implemented at any location such as, for example, at the location of the vehicle 12, at the location of the vehicle 14, at the location of the hazard server 24, and so on, or combinations thereof. In one example, a pairwise comparison may be implemented by the hazard server 24 utilizing image data received and a local database of images, a database of images accessible to the hazard server 24 e.g., via an image service or an image server, and so on, or combinations thereof. The result of the comparison may be provided by the hazard server 24. In another example, a pairwise comparison may be implemented by the vehicle 12 and/or the vehicle 14 utilizing captured image data and a local database of images, a database of images accessible to the vehicles 12, 14 e.g., via an image service or an image server, and so on, or combinations thereof. The result of the pairwise comparison may be provided by the vehicles 12, 14.

In a further example, the front-facing camera and/or the rear-facing camera of the vehicles 12, 14 may capture image data to be used to recognize one or more elements of the road 16 such as, for example, a lane divider between the emergency lane 18a and the travel lane 20. In addition, the front-facing camera and/or the rear-facing camera of the vehicles 12, 14 may capture image data to be used to recognize one or more elements indicating a hazard event such as, for example, veering toward a guard rail, veering toward a pre-defined landscape (e.g., trees, bushes, etc.). Moreover, the front-facing camera and/or the rear-facing camera of the vehicles 12, 14 may capture image data to be used to recognize one or more elements indicating a hazard state such as, for example, where an image includes a relatively static optical flow when the vehicle 12 is parked, where an image is tilted when the vehicle 12 is being towed or during a tire change, and so on.

Thus, for example, the front-facing camera and/or the rear-facing camera of the vehicles 12 may provide image data used in an element recognition process to recognize a lane divider and a guard rail to indicate that the vehicle 12 is veering across a lane divider toward a guard rail at time T1, while the front-facing camera of the vehicle 14 may provide image data used in an element recognition process to recognize the vehicle 12 and the lane divider to indicate that the vehicle 12 is veering across the lane divider towards the emergency lane 18a at time T1. Accordingly, elements (e.g., objects, features, landscapes, etc.) in the field of view of the front-facing camera and/or the rear-facing camera of the vehicles 12, 14 may be used to generate and/or provide road hazard data.

In another example, image recognition of a tow truck may indicate a hazard, image recognition of a flare may indicate a hazard, image recognition of an emergency responder (e.g., vehicle such as a police vehicle, person such as a fireman, etc.) may indicate a hazard, and so on, or combinations thereof. Thus, a device associated with an object causing a road hazard may report the hazard by generating and/or providing road hazard data (e.g., including the image data), a device associated with oncoming traffic may report the hazard by generating and/or providing the road hazard data (e.g., including the image data), and so on, or combinations thereof. It should be understood that other devices (e.g., a camera on a road, a camera on an aircraft, a speed camera, a satellite camera, etc.) may be used alone, or in combination with a device associated with an object causing the hazard and/or a device associated with oncoming traffic to provide the road hazard data. It should also be understood that any pre-defined event and/or sate may be reported automatically to alert and/or notify of users about a hazard.

In the illustrated example of FIG. 1B, the road 16 includes a street with a sidewalk 18b and two or more travel lanes 20, 22. At time T1, a moving object such as a bicycle 28 in the lane 20 causes a hazard on the road 16, which may include any event, state, etc. that is hazardous and/or dangerous to traffic on the road 16. For example, the hazard may include an event caused by the bicycle 28 such as cycling in the lane 20, crossing the lane 20, and so on, or combinations thereof. The hazard may also include a state of the bicycle 28 such as being stationary in the lane 20, being positioned in the travel lane 20, and so on. Thus, at time T1, the vehicle 14 in the travel lane 20 approaches the hazard caused by the vehicle 12.

A device associated with the bicycle 28 may report the hazard. The device may be associated with the bicycle 28 using, for example, an authentication mechanism (e.g., username, profile, encryption keys, etc.), an address (e.g., mobile internes device address, internet protocol address, media access control address, etc.), a connection (e.g., a WiFi connection, a Bluetooth connection, a cellular connection, etc.), proximity to the bicycle 28 (e.g., on a bicycle, etc.), and so on, or combinations thereof. The device may include any computing device and/or data platform, such as, for example, a laptop, personal digital assistant (PDA), wireless smart phone, media content player, imaging device, mobile Internet device (MID), any smart device such as a smart phone, smart tablet, smart TV, wearable computer, and so on, or any combination thereof. Thus, the device may include a mobile computing device (e.g., smart phone) of a cyclist 30 riding the bicycle 28. In another example, the device may include any on-board computing system which is integral with and/or mechanically removable from the bicycle 28 such as, for example, an in-vehicle infotainment (IVI) system, a navigation system, a bicycle computer system, and so on, or combinations thereof. Thus, the computing device may include a display, an audio component, an image capture device, and so on, or combinations thereof.

The device associated with the bicycle 28 may automatically generate and provide the road hazard data for the bicycle 28. In one example, the road hazard data may include accelerometer data, gyroscope data, global positioning data, image data, and so on, or combinations thereof. It should be understood that the road hazard data (e.g. including image data) may also be generated and/or provided by a device associated with the vehicle 14, alone or in combination with the road hazard data (e.g. including image data) provided by the device associated with the bicycle 28. For example, a front-facing camera of the vehicle 14 may capture image data to be used in an element recognition process to recognize the bicycle 28 and/or the cyclist 30, wherein the image data and/or a result of a pair-wise comparison may be generated and/or provided to the hazard server 24. In addition, the road hazard data may be continually provided to the hazard server 24. Thus, at time T2 in the illustrated example of FIG. 1B, the road hazard data indicating that the bicycle 28 is in the travel lane 20 may be provided to the hazard server 24. In response to the road hazard data a map merged with the road hazard data, and/or an alert, may be provided at time T3 by the hazard server 24 and/or the service 26.

Thus, for example, the hazard server 24 and/or the service 26 may provide (e.g., transmit) the road hazard data to the device associated with the bicycle 28 at time T4 as a map merged with the road hazard data, as an alert including hazard details for the road hazard data independently of the map, and so on, or combinations thereof. Moreover, the alert may cause the approaching vehicle 14 to manually avoid the moving hazard and/or automatically avoid the moving hazard at time T5. Thus, the vehicle 14 may move from the lane 20 to the lane 22 at time T5 to avoid the hazard caused by the bicycle 28 and/or the cyclist 30. It should be understood that repeated alerts may be generated to notify of a change in approaching hazards caused by a moving object such as the bicycle 28, wherein the approaching vehicle 14 may continually update the action taken to avoid the hazard.

Figure 2A:
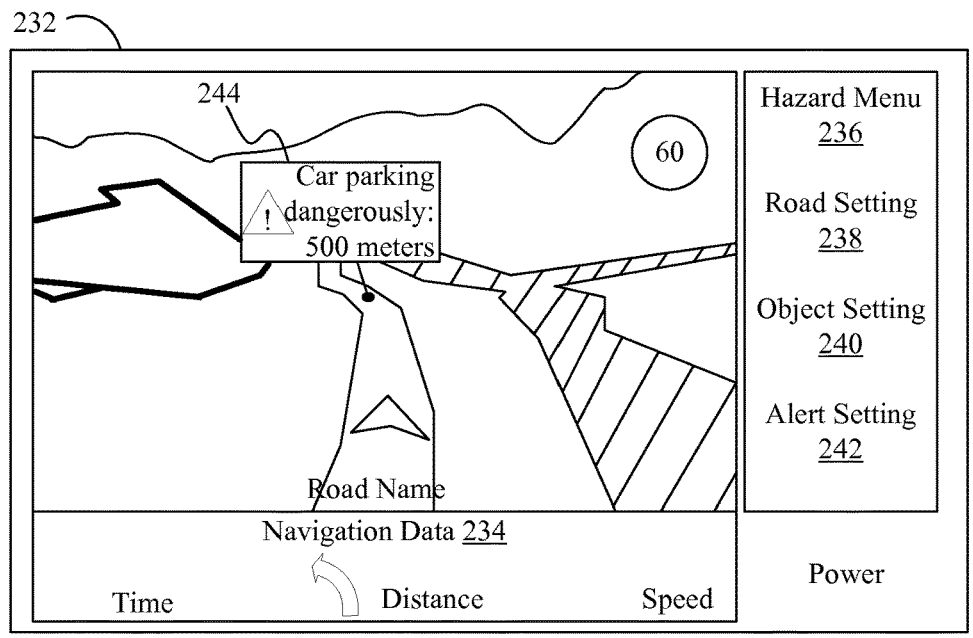
FIGS. 2A and 2B are block diagrams of an example client user interface according to an embodiment.
Figure 2B:
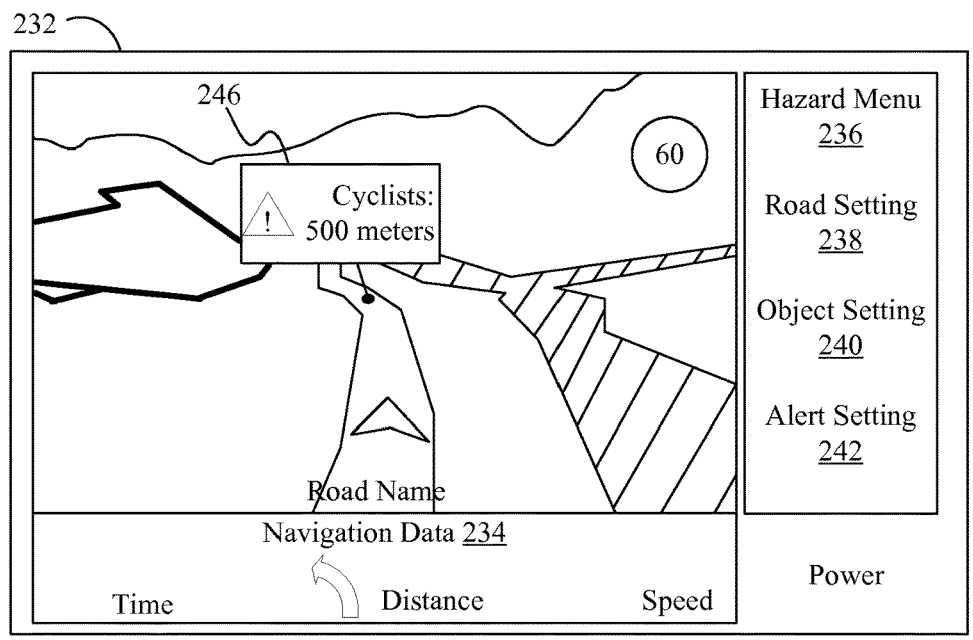

Turning now to FIGS. 2A and 2B, a client user interface 202 is shown according to an embodiment. The client user interface 202 may include a client application, a client device (e.g., a mobile computing device, an IVI system, a navigation system, an on-board computer system, etc.), and so on, or combinations thereof. In the illustrated example, the client user interface 202 includes a display 232 to render navigation data 234. In the illustrated example of FIGS. 2A to 2B, navigation data 234 includes a standard view map showing topography proximate to an object's (e.g., a vehicle, etc.) position that is associated with the client user interface 202. The map rendered on the display 232 via the client user interface 202 may include any view, such as a satellite view, a hybrid standard-satellite view, and so on, or combinations thereof. In addition, the map rendered on the display 232 via the client user interface 202 may include any region of interest, such as an entire navigation path of interest to a user, a portion thereof, and so on.

In the illustrated example, the navigation data 234 also includes the name of the road the object is traveling (e.g., "Road Name"), the current local time (e.g., "Time"), the speed the object is traveling (e.g. "Speed"), the distance remaining before the path of the object should change (e.g., "Distance), the direction that the object should change once the distance is reached (e.g., arrow), and the speed limit of the road (e.g., the integer 60). The settings for the navigation data 234 may be provided by a main menu of the user client interface 202, which may include options to set map views, type of data to be displayed, the units of the data to be displayed (e.g., miles, meters, etc.), the color of the elements on the map, the brightness of the display, day settings, night settings, text-to-speech language settings, and so on, or combinations thereof.

The illustrated client user interface 202 also includes a hazard menu 236, which may be accessed from the main menu. The hazard menu 236 may provide any setting related to road hazard data and/or alerts based on the road hazard data. For example, the hazard menu 236 includes a road setting tab 238 to define road hazard data to be generated, received, and/or rendered for a particular the type of road being traveled. Thus, the road setting tab 238 may include an option to, for example, generate and receive road hazard data for parking vehicles when traveling on a highway, exclude generating or receiving road hazard data for parked vehicle when traveling on a street, include generating and receiving road hazard data for bicycles when traveling on a street, and so on, or combinations thereof. The hazard menu 236 also includes an object setting tab 240 to define road hazard data to be generated, received, and/or rendered for a particular the type of object on the road. For example, the object setting 240 may include an option to generate and receive road hazard data for a particular type of vehicle, such as for a car, and to exclude generating or receive road hazard data for another particular type of vehicle, such as a motorcycle.

The hazard menu 236 also includes an alert setting tab 242 to define an alert to be generated, received, and/or rendered based on the road hazard data. For example, the alert setting tab 242 may include an option to generate an alert for a parking vehicle and not for a parked vehicle, an option to receive an alert for a bicycle in the road and not for a bicycle crossing the road, and so on, or combinations thereof. In addition, the alert setting tab 242 may define a representation for an alert to be generated, received, and/or rendered. For example, the alert setting tab 242 may include an option to generate and/or render a visual alert, such as a visual alert 244 illustrated in FIG. 1A and/or a visual alert 246 illustrated in FIG. 1B. The alert setting tab may also include option to, for example, define the properties of the visual alert (e.g., appearance, size, color, content, icons, images, window features such as automatic pop-up window or selectable pop-up window, etc.), choose a preset profile (e.g., highway profile, street profile, etc.), and so on, or combinations thereof.

The alert setting tab 242 may also include an option to generate and/or render an audio alert, such as a text-to-speech alert, a chime (e.g., custom sound, preset sound, etc.), and so on, or combinations thereof. The alert setting tab 242 may also include an option to define the output device of the alert, such as a speaker of the client user interface 202, a speaker of a vehicle, a speaker of a device associated with the vehicle (e.g., smart phone, etc.), and so on, or combinations thereof. In the illustrated examples of FIGS. 2A to 2B, the visual alerts 244, 246 may be rendered on the display 232 via the client user interface 202, which is associated with a vehicle where the client user interface 202 resides. While not shown, it should be understood that the hazard menu 236 may include any other setting to generate, receive, and/or render road hazard data such as, for example, image capture settings. In one example, an image capture setting may be used to specify whether to use a camera, to specify which camera to use, to specify the conditions to use the camera, to specify night-vision functionality, and so on, or combinations thereof.

In one example, the visual alert 244 may be rendered at the vehicle 14 illustrated in FIG. 1A when the client user interface 202 is associated with the vehicle 14. The illustrated visual alert 244 includes hazard details, such as a description of the hazard, the distance to the hazard, and so on. An accompanying audio alert such as a chime or a text-to-speech reciting the description of the hazard in visual alert 244 may also be rendered via the client user interface 202. Thus, the display 232 of the client user interface 202 may render the visual alert 244 (e.g., a parking car 500 meters away) and cause the hazard to be avoided by the vehicle 14. In the illustrated example of FIG. 2B, a visual alert 246 may be rendered at the vehicle 14 illustrated in FIG. 1B when the client user interface 202 is associated with the vehicle 14. The illustrated visual alert 246 includes hazard details, such as a description of the hazard, the distance to the hazard, and so on. An accompanying audio alert such as a chime or a text-to-speech reciting the description of the hazard in visual alert 246 may also be rendered via the client user interface 202. Thus, the display 232 of the client user interface 202 may render the visual alert 246 (e.g., a cyclist 500 meters away) and cause the hazard to be avoided by the vehicle 14.

Figure 3:
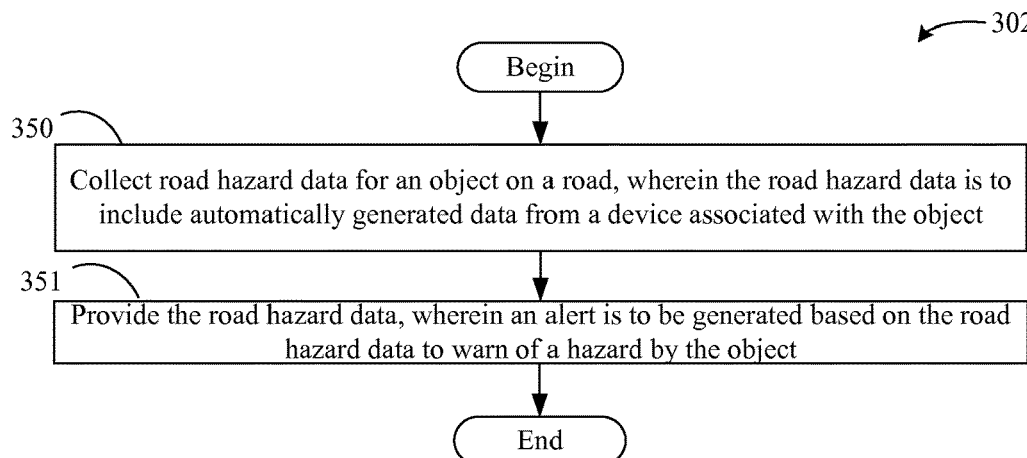
FIG. 3 is a flowchart of an example of a method to communicate a road hazard according to an embodiment.

FIG. 3 shows a method 302 to communicate a road hazard according to an embodiment. The method 302 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), CMOS or transistor-transistor logic (TTL) technology, or any combination thereof. For example, computer program code to carry out operations shown in the method 302 may be written in any combination of one or more programming languages, including an object oriented programming language such as C++ or the like and conventional procedural programming languages, such as the "C" programming language or similar programming languages. Moreover, the method 302 may be implemented using any of the herein mentioned circuit technologies.

Illustrated processing block 350 involves collecting road hazard data for an object on a road. The object on the road may include a vehicle, such as an automobile, a motorcycle, a truck, a bicycle, a pedestrian, and so on, or combinations thereof. In addition, the road may include a highway having one or more lanes such as, for example, an emergency lane, a travel lane, and so on, to combinations thereof. The road may include a street having one or more lanes such as, for example, a walk lane, a travel lane, and so on, or combinations thereof. The hazard caused by the object may include any event, state, etc., that is hazardous and/or dangerous to traffic on the road, such as slowing to a dangerous velocity, parking in the emergency lane of the road, cycling in the travel lane of the road, and so on, or combinations thereof. The road hazard data may include, for example, accelerometer data, gyroscope data, global positioning data, hazard feature data, image data, and so on, or combinations thereof.

The processing block 350 involves collecting automatically generated data from a device associated with the object causing the hazard. It should be understood that the method 302 may include data collected that is not automatically generated (e.g., manually generated) and/or that is automatically generated by a device not associated with the object causing the hazard. For example, the road hazard data may include data automatically generated and/or provided by an image capture device on the road (e.g., a speed camera, etc.), by a device associated with an object (e.g., a vehicle) approaching the hazard, and so on, or combinations thereof. The device generating the road hazard data may include any computing device and/or data platform, such as a laptop, personal digital assistant (PDA), wireless smart phone, media content player, imaging device, mobile Internet device (MID), any smart device such as a smart phone, smart tablet, smart TV, wearable computer, and so on, or combinations thereof. The device may also include any on-board computing system integral with and/or mechanically removable from the object such as, for example, an in-vehicle infotainment (WI) system, a navigation system, a vehicle computer system, a bicycle computer system, and so on, or combinations thereof.

The device may render a generation setting to set, for example, the type of road hazard data to generate, the road hazard data to provide, and so on, or combinations thereof. The device may include a display (and/or output to a display) to input the road hazard data, such as a 2D display, a 3D display, a windshield display, an eye glass display, a touch screen display, a LCD, a LED display and so on, or combinations thereof. In addition, the device may include an audio component, such as a speaker, a microphone to input data, and so on, or combinations thereof. Moreover, the device may include an image capture device to capture image data, wherein the image capture device may include, for example, a front-facing camera, a rear-facing camera, a 2D camera, a 3D camera, a night-vision camera, and so on, or combinations thereof.

In one example, the object causing the hazard may include a vehicle at a side of a highway and/or a bicycle in a traveling lane of a street, wherein the road hazard data may include object position data and/or the device may include a mobile computing device of an object user (e.g., vehicle driver, etc.). Thus, the device associated with the object causing the hazard on the road may capture image data (e.g., a video, a frame of a video, a picture, etc.), may determine a position of the object, and/or may determine a utilization of a hazard feature of the object, such as a location on the road, utilization of hazard lights, and so on, or combinations thereof.

The device may provide the road hazard data to a server, which may include a cloud-computing server. In one example, the cloud-computing server may be a part of a plurality of connected computers through a communication network and may engage in distributed computing over the network. In one example, the server may engage in distributed computing to run a program, an application, etc., on various connected computers at the same time. In another example, the server may engage in distributed computing to provide network-based services over physical server hardware, virtual hardware, and so on, or combinations thereof. Thus, the server may collect the road hazard data, wherein the road hazard data may include automatically generated data from a device associated with the object causing the hazard, from a device associated with an approaching object (e.g., to the hazard, etc.), from a device independent of the device causing the hazard and/or the oncoming object, and so on, or combinations thereof.

Illustrated block 351 involves providing the road hazard data, wherein an alert may be generated based on the road hazard data to warn of a hazard caused by the object. In one example, a server collecting the road hazard data may include an application programming interface (API) to allow a service (e.g., a map service) to access the road hazard data and integrate the road hazard data with a service, an application, a device, and so on, or combinations thereof. For example, a map service may merge the road hazard data with a map, wherein an alert based on the road hazard data may appear on the map to warn an approaching object user (e.g., approaching vehicle driver, etc.) of the hazard.

In another example, the server may include a network interface to provide the road hazard data directly to a client user interface, with or without the API. For example, the server may provide a service such as tow-truck service, a law enforcement service, a traffic warning service, a map service, a navigation service, and so on, or combinations thereof. Thus, for example, the server may merge the road hazard data with a map and provide the map to the client user interface for a map service (e.g., to a map client), a navigation service (e.g., to a navigation client), and so on, or combinations thereof. In addition, the server may generate the alert based on the road hazard data, wherein the alert may appear on the map to warn an approaching object user (e.g. approaching vehicle driver, etc.) of the hazard.

The alert may include any visual representation and/or audio representation of the road hazard data, such as a point generated on the map, a window generated on the map, a drop pin generated on the map, an icon generated on the map and so on, or combinations thereof. In addition, the alert may include a message to be displayed, independent of the map, including hazard details such as a written summary of the event, written distance to the hazard, and so on, or combinations thereof. The alert may also include audio data, such as a text-to-speech message, a chime sound, and so on, or combinations thereof.

The server and/or the service may provide the road hazard data to a device associated with an approaching object such as, for example, a vehicle approaching the hazard, a vehicle approaching the object that caused the hazard, and so on, or combinations thereof. The device may be the same or different type of device (e.g., a mobile device, an integral IVI device, etc.) with the same or different capabilities (e.g., audio/video functionality, hazard reporting, alert rendering, etc.) as the device that reported the hazard. The device may render a map merged with the road hazard data, navigation data, and so on, or combinations thereof. In addition, device may render the alert.

The device may render an alert setting, such as a road setting, an object setting, an alert setting, and so on, or combinations thereof. In one example, the device may include a display (and/or output to a display) to present the alert, such as a 2D display, a 3D display, a windshield display, an eye glass display, a touch screen display, a LCD, a LED display and so on, or combinations thereof. In addition, the device may include an audio component, such as a speaker to render the alert, a microphone to input data, and so on, or combinations thereof. Moreover, the device may include an image capture device to capture image data, wherein the image capture device may include, for example, a front-facing camera, a rear-facing camera, a 2D camera, a 3D camera, a night-vision camera, and so on, or combinations thereof.

The alert may cause the approaching object to manually avoid the hazard caused by the object. For example, a driver of an approaching vehicle may view and/or hear the alert and manually switch the lane of the vehicle. In another example, the driver of the approaching vehicle may view and/or hear the alert and manually switch the path of the vehicle off of the road, which may be determined based on a map service, a navigation service, and so on, or combinations thereof. In addition, the alert may cause the object to automatically avoid the hazard. For example, a device associated with a vehicle (e.g., an IVI system, an on-board vehicle computer system) may automatically switch the lane of the vehicle when a computer controls the vehicle.

Figure 4:
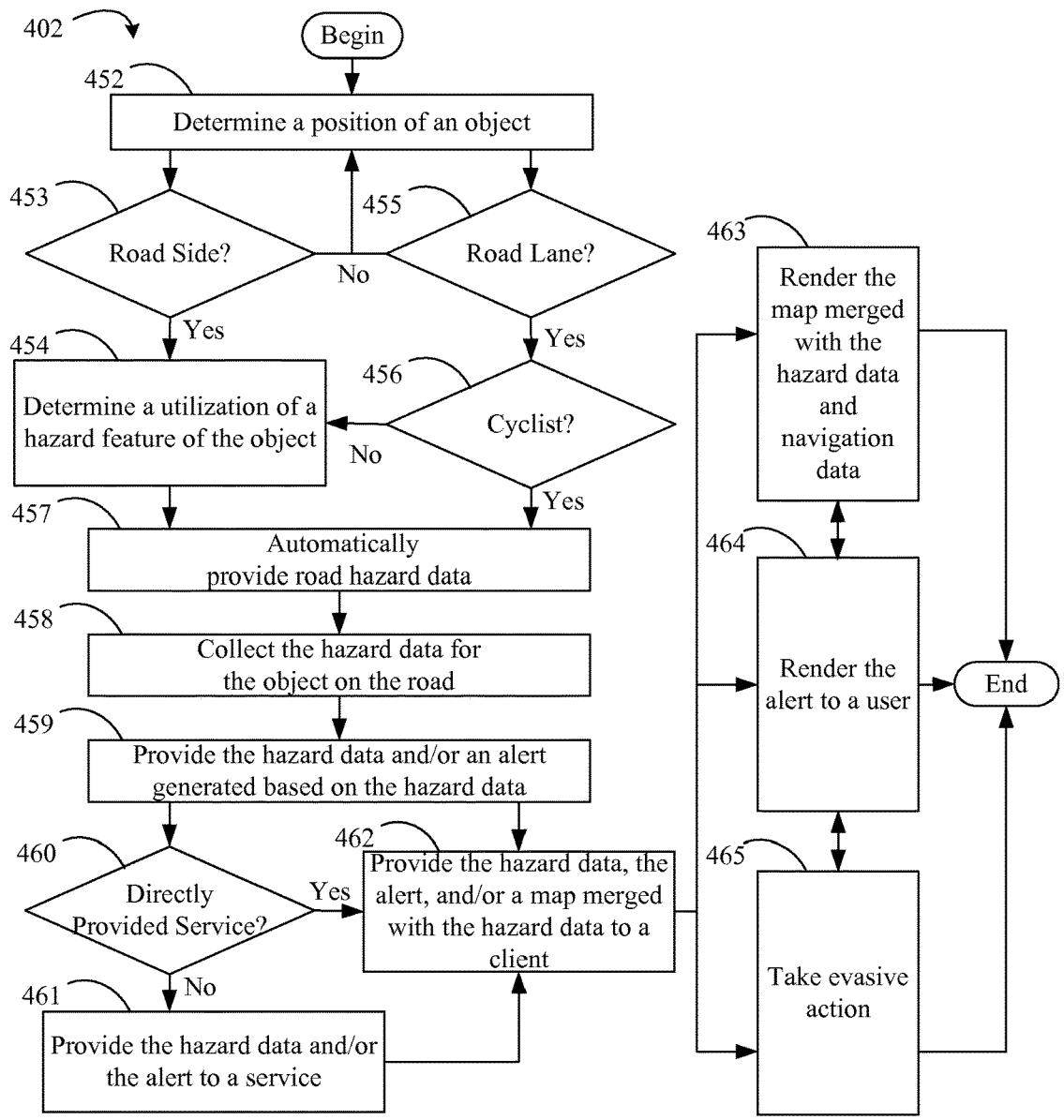
FIG. 4 is a flowchart of an example of a method to communicate a road hazard according to an embodiment.

Turning now to FIG. 4, a method 402 to communicate a road hazard is shown according to an embodiment. The method 402 may be implemented using any of the herein mentioned technologies. Thus, the method 402 may be implemented as a set of logic instructions and/or firmware stored in a machine- or computer-readable storage medium, and so on. Illustrated processing block 452 determines a position of an object. In one example, the position of the object may be determined using global positioning system (GPS) data. A determination may be made at block 453 as to whether the object is at a side of a road. For example, the object may be veering toward a side of a road, may be crossing into an emergency lane of a road, may be exiting an emergency lane of a road, and so on. If so, processing block 454 determines a utilization of a hazard feature of the object, such as utilization of hazard lights, and so on. Thus, road hazard data such as the location of the object and the utilization of hazard features may be automatically generated.

If the object is not at a side of the road, the method 402 may return back to the processing block 452 to determine a position of the same object, another object, and so on, or combinations thereof. A determination may be made at block 455 as to whether the object is in a travel lane. If not, the method 402 may return back to the processing block 452 to determine a position of the same object, another object, and so on, or combinations thereof. If the object is in the travel lane of the road, a determination may be made at block 456 as to whether the object is a bicycle, a cyclist, and so on. If not, the processing block 454 may determine a utilization of a feature hazard since the object may include, for example, a broken down car in the travel lane of the road that is utilizing hazard lights. If the object is in the travel lane and is a cyclist, road hazard data automatically generated that indicates the location of the object, the type of object, etc., may be provided. In the illustrated example of FIG. 4, processing block 457 automatically provides the automatically generated road hazard data (e.g., the position data, the feature utilization data, etc.).

Processing block 458 collects the road hazard data for the object on the road. For example, the road hazard data may be stored in memory, in a hard drive, in a library, in a table, and so on, or combinations thereof. Processing block 459 provides access to the road hazard data, which may be in any format such as, for example, raw hazard data, hazard data integrated with a map, an alert representing the hazard data, and so on, or combinations thereof. For example, the processing block 459 may involve an application programming interface (API) to provide access to the road hazard data, a network interface to provide access to the road hazard data, and so on, or combinations thereof.

A determination may be made at block 460 as to whether a service is directly provided, such as a map service. If not, processing block 461 provides the road hazard data and/or the alert to a service, such as a map service, a navigation service, a traffic service, etc. The service may integrate the road hazard data with an application, a device, etc., and provide the road hazard data to a client application, a client device, and so on, or combinations thereof. If a service is to be directly provided, the road hazard data may be directly integrated with the service. For example, the road hazard data may be merged with a map for a map service, a navigation service, and so on, or combinations thereof. Thus, processing block 462 may provide the road hazard data, the alert, and/or a map (e.g., for a map service) merged with the road hazard data to a client application, a client device, etc. of a client (e.g., map client, navigation client, etc.).

Processing block 463 renders the map merged with the road hazard data and other data, such as navigation data. For example, a client user interface may be used to display the map merged with the road hazard data and the navigation data. Processing block 464 provides for rendering the alert to the user. For example, the alert may be rendered on the map. The alert may also be rendered independently of the map, for example by using an audio alert, by presenting the alert on a display, by presenting the alert without the map, and so on. In addition, processing block 465 provides for taking evasive action in response to the alert. For example, the evasive action may include manually changing a lane of approaching traffic to avoid the hazard, automatically changing a navigation path of approaching traffic to avoid the hazard, and so on, or combinations thereof.

Figure 5:
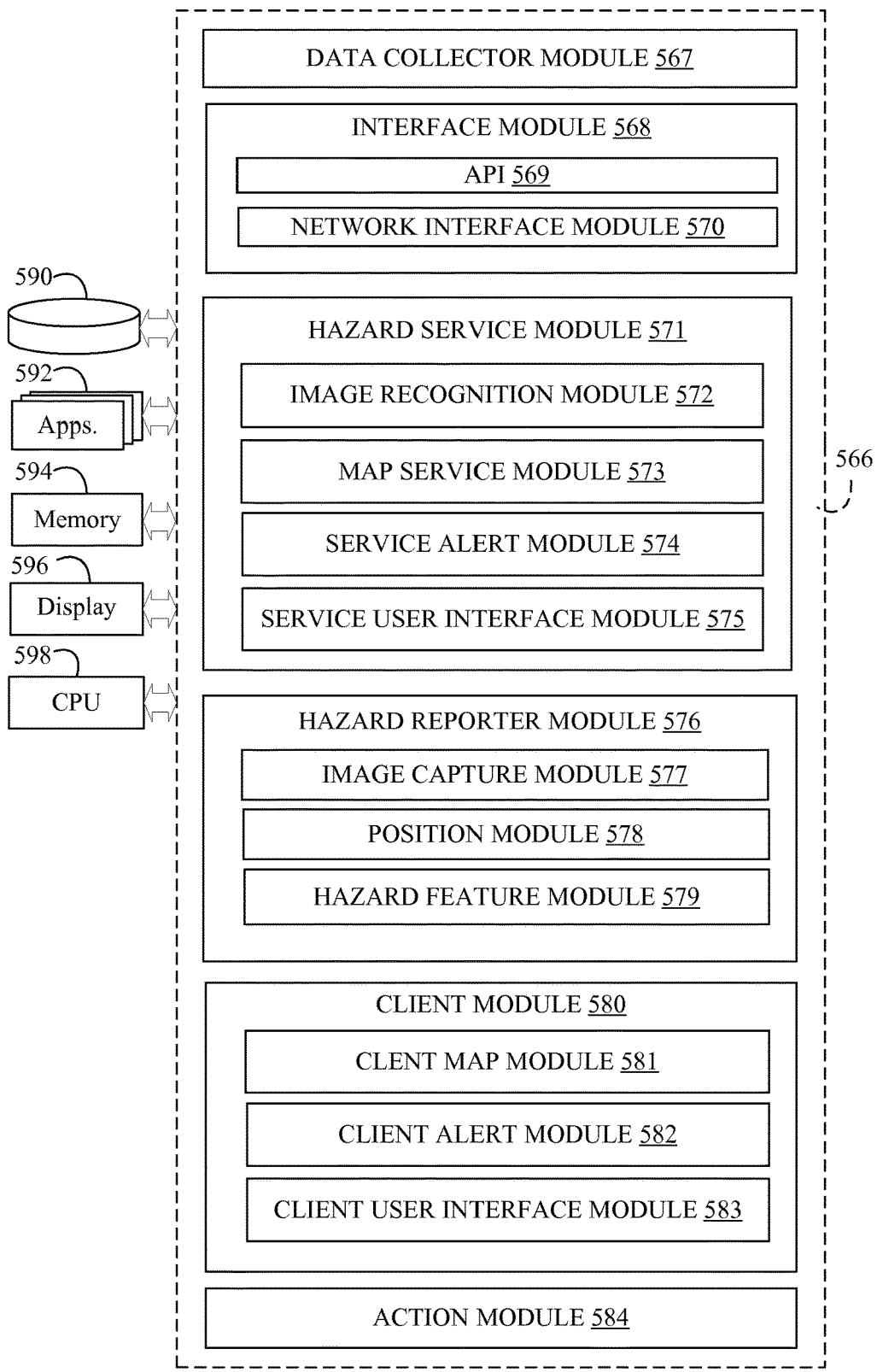
FIG. 5 is a block diagram of an example of a logic architecture according to an embodiment.

FIG. 5 shows an apparatus 502 including logic 566 to communicate a road hazard according to an embodiment. The logic architecture 566 may be generally incorporated into a platform such as such as a laptop, personal digital assistant (PDA), wireless smart phone, media player, imaging device, mobile Internet device (MID), any smart device such as a smart phone, smart tablet, smart TV, computer server, wearable computer, in-vehicle infotainment (WI) system, navigation system, vehicle computer system, bicycle computer system, server, and so on, or combinations thereof. The logic architecture 566 may be implemented in an application, operating system, media framework, hardware component, and so on, or combinations thereof. For example, the logic architecture 566 may be implemented in a processor, such as a central processing unit (CPU), a graphical processing unit (GPU), a visual processing unit (VPU), a sensor, an operating system, an application, and so on, or combinations thereof. The apparatus 502 may include and/or interact with storage 590, applications 592, memory 594, display 596, CPU 598, and so on, or combinations thereof.

In the illustrated example, the logic architecture 566 includes a data collector module 567 to collect road hazard data for an object on a road. In one example, the road hazard data may include automatically generated and/or provided data from a device associated with the object. The object on the road may include a vehicle, such as an automobile, a motorcycle, a truck, a bicycle, pedestrians, and so on, or combinations thereof. In addition, the road may include a highway including an emergency lane, a travel lane, and so on, to combinations thereof. The road may also include a street including a walk lane, a travel lane, and so on, or combinations thereof.

The hazard caused by the object may include any event, state, etc., that is hazardous and/or dangerous to traffic on the road (e.g., vehicles, drivers, passengers, pedestrians, etc.), such as slowing to a dangerous velocity, parking in the emergency lane of the road, cycling in the travel lane of the road, and so on, or combinations thereof. The data collector module 567 may collect road hazard data including, for example, accelerometer data, gyroscope data, global positioning data, hazard feature data, image data, and so on, or combinations thereof. The data collector module 567 may, for example, store the road hazard data in the storage 590, the memory 594, off-platform memory, and so on, or combinations thereof.

The logic architecture 566 includes an interface module 568 to provide the road hazard data. In the illustrated example, the interface module 568 includes an application programming interface (API) module 569 to allow, for example, a service (e.g., a map service) to access the road hazard data and integrate the road hazard data with a service, an application, a device, and so on, or combinations thereof. For example, a map service may merge the road hazard data with a map, wherein an alert based on the road hazard data may appear on the map to warn an approaching object user (e.g., approaching vehicle driver, etc.) of the hazard. The interface module 568 may also include a network interface module 570 to provide (e.g., transmit) the road hazard data with or without the API module 569. The network interface module 570 may provide a wide variety of communication functionality, such as cellular telephone (e.g., W-CDMA (UMTS), CDMA2000 (IS-856/IS-2000), etc.), WiFi, Bluetooth (e.g., IEEE 802.15.1-2005, Wireless Personal Area Networks), WiMax (e.g., IEEE 802.16-2004), Global Positioning Systems (GPS), spread spectrum (e.g., 900 MHz), and other radio frequency (RF) telephony purposes.

The logic architecture 566 includes a hazard service module 571, which may provide a service to a client. The illustrated hazard service module 571 includes an image recognition module 572 to recognize an element of an image. In one example, the image recognition module 572 may implement an element recognition process (e.g., pair-wise comparison, etc.) to recognize an element (e.g., object, feature, landscape, etc.) of an image including, for example, a video, a frame of a video, a photograph, and so on, or combinations thereof. The hazard service module 571 also includes a map service module 573 to merge the road hazard data with a map. For example, the map service module 573 may merge the road hazard data from the memory 594 with a map from the storage 590, and provide the map to the client user interface via the network interface module 570 for a map service, a navigation service, and so on. In another example, the map service module 573 may utilize the network interface module 570 to obtain the map to merge the map with the road hazard data.

The hazard service module 571 also induces a service alert module 574 to generate an alert based on the road hazard data, wherein the alert may appear on the map to warn an object (e.g., approaching traffic, vehicle driver, vehicle passenger, service user, etc.) of the hazard. The alert may include any visual representation and/or audio representation of the road hazard data, such as point on the map, an icon on the map, a text message, a text-to-speech message, a chime, and so on, or combinations thereof. In addition, the hazard service module 571 includes a service user interface module 575 to provide a service setting. The service user interface module 575 may provide any desired interface, such as a graphical user interface, a command line interface, and so on, or combinations thereof. The service user interface module 575 may provide access to one or more settings associated with road hazard data, such as options to define service type (e.g., map service, etc.), scope of road hazard data (e.g., temporal scope, geographic scope, etc.), client registration (e.g., security, proximity to object, etc.), and so on, or combinations thereof. In one example, the service user interface module 575 utilizes the display 596 to render the service setting.

The logic architecture 566 includes a hazard reporter module 576 to generate and/or provide the road hazard data. The illustrated hazard reporter module 576 includes an image capture module 577 to capture image data. In one example, the image capture module 577 may capture image data including, for example, a video, a frame of a video, a photograph, and so on, or combinations thereof. The captured image data may be used to recognize an element of an image. For example, the image recognition module 572 may use the captured image data to recognize an element in a frame of a video. The hazard reporter module 575 includes a position module 578 to determine a position (or any other data related to movement) of the object causing the hazard. For example, the position module 578 may utilize a sensor (e.g., an accelerometer, a gyroscope, a global positioning system, etc.) to determine accelerometer data, gyroscope data, global positioning data, and so on. The hazard reporter module 575 also includes a hazard feature module 579 to determine a utilization of a hazard feature of the object. For example, the hazard feature module 579 may utilize the CPU 598 to determine whether hazard lights are utilized, signal lights are utilized, warning lights are utilized (e.g., check engine, etc.) and so on, or combinations thereof. In one example, the hazard reporter module 576 may communicate the road hazard data to the data collector module 567.

The logic architecture 566 includes a client module 580 to render data. The client module 580 includes a client map module 581 to render the map merged with the road hazard data, navigation data, and so on, or combinations thereof. In one example, the client map module 581 may utilize the display 596 to render the map. The client module 580 also induces a client alert module 582 to render the alert, for example from the service alert module 574. In one example, the client alert module 582 may utilize the display 596 to render the alert, an audio component to render the alert, and so on, or combinations thereof. In addition, the client module 580 includes a client user interface module 583 to render a client setting, such as a road setting, an object setting, an alert setting, an image capture setting, and so on, or combinations thereof. The client user interface module 583 may provide any desired interface, such as a graphical user interface, a command line interface, and so on, or combinations thereof. In one example, the client user interface module 583 may utilize the display 596 to render a client setting.

The logic architecture 566 includes an action module 584 to provide evasive action. For example, the action module 584 may cause an approaching object (e.g., approaching traffic, an approaching vehicle, etc.) to automatically avoid the hazard in response to the alert. In one example, the action module 584 may utilize the CPU 598 to change a lane of the approaching object. In another example, the action module 584 may utilize a global positioning system and the CPU 598 to automatically switch and a navigation path of the approaching object. In a further example, the action module 584 may utilize the GPS and the display 596 to render the new path to cause a driver of the approaching object to manually change the lane of the approaching object, and so on. Thus, it should be understood that generating and/or providing the road hazard data may itself operate as an alert without audio and/or visual representation. For example, the receipt of generated road hazard data at the approaching object may be utilized without user awareness (e.g., without a visual alert, an audio alert, etc.) to avoid the hazard.

While examples have shown separate modules for illustration purposes, it is should be understood that one or more of the modules of the logic architecture 566 may be implemented in one or more combined modules, such as a single module including the map service module 573 and the service alert module 574 used to generate a map with merged road hazard data and alerts. In another example, a single module may include one or more of the data collector module 567, the interface module 568, the hazard service module 571, the hazard reporter module 576, the client module 580, and the action module 584. In addition, it should be understood that one or more logic components of the apparatus 566 may be on platform, off platform, and/or reside in the same or different real and/or virtual space as the apparatus 502. For example, the data collector module 567 may reside in a cloud-computing environment on a server while one or more of the other modules of the logic architecture 566 may reside on a computing platform where a user is physically located, and vice versa, or combinations thereof.

Figure 6:
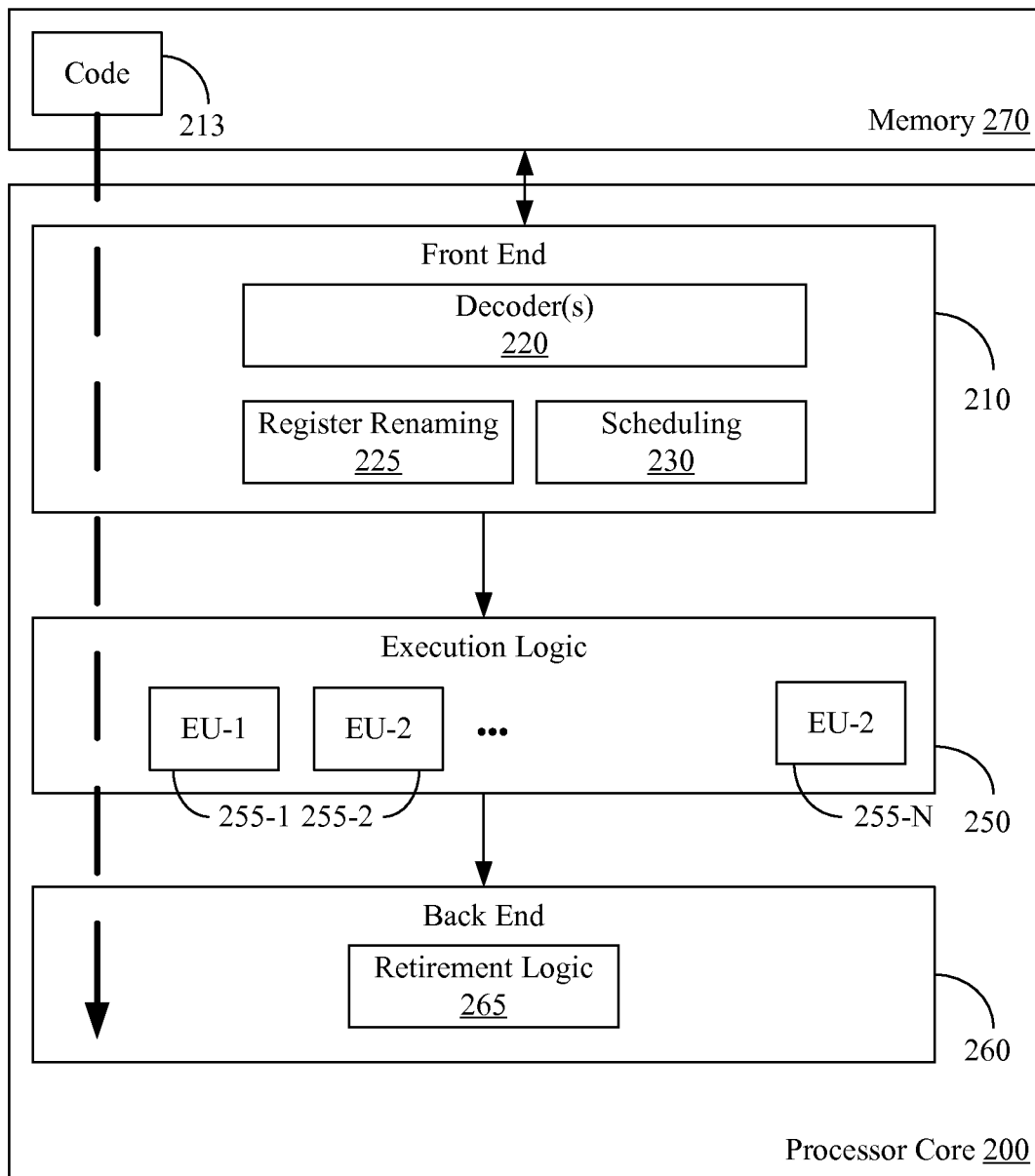
FIG. 6 is a block diagram of an example of a processor according to an embodiment.

Turning now to FIG. 6, a processor core 200 according to one embodiment is shown. The processor core 200 may be the core for any type of processor, such as a micro-processor, an embedded processor, a digital signal processor (DSP), a network processor, or other device to execute code to implement the technologies described herein. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the logic architecture 566 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that may perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 7:
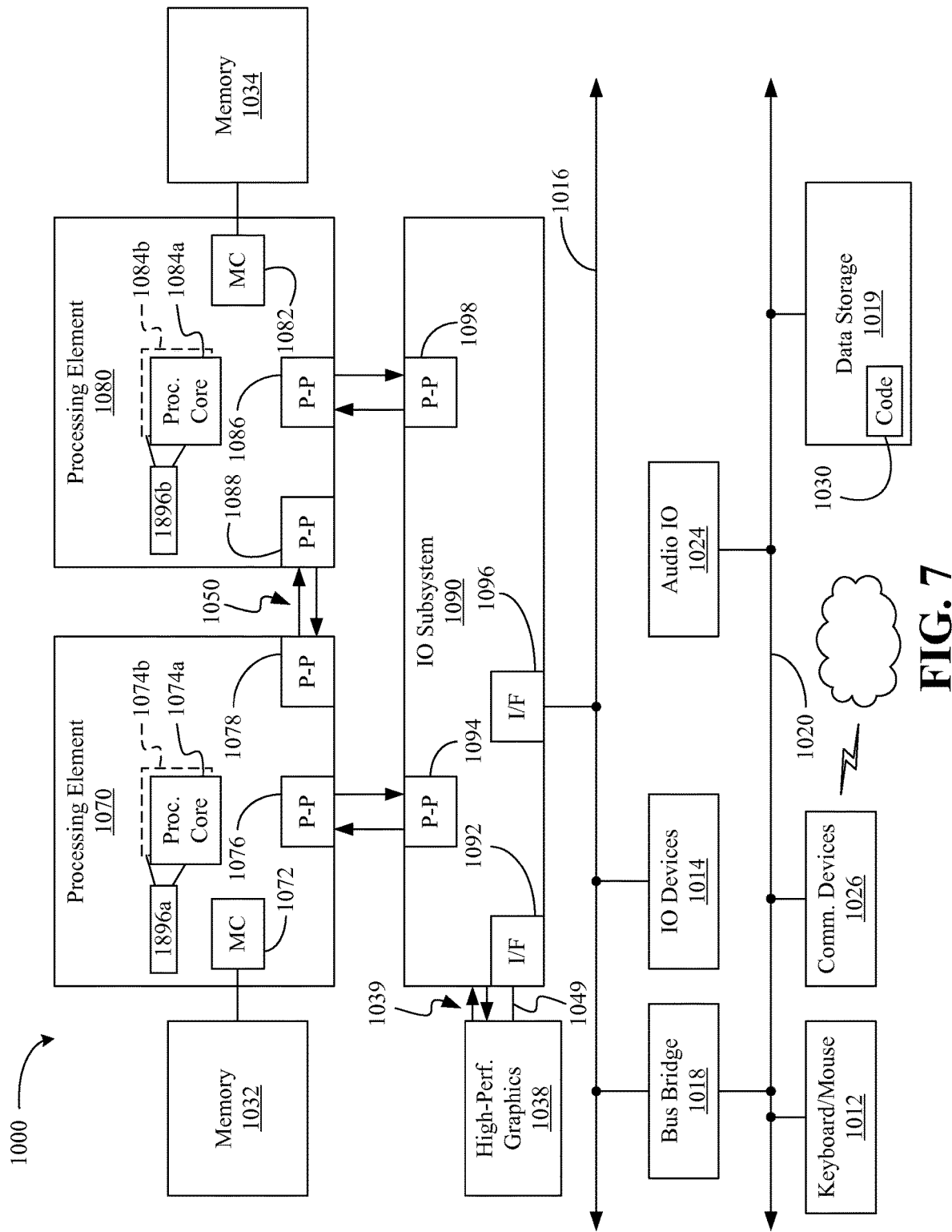
FIG. 7 is a block diagram of an example of a system according to an embodiment.

FIG. 7 shows a block diagram of a system 1000 in accordance with an embodiment. Shown in FIG. 7 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 6.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There may be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope is not so limited.

As shown in FIG. 7, various I/O devices 1014 such as the display 232 (FIGS. 2A and 2B) and/or the display 596 (FIG. 5) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the logic architecture 566 (FIG. 5), already discussed. Further, an audio I/O 1024 may be coupled to second bus 1020.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

Thus, embodiments may report on-road and/or off-road dangerous events such as, for example, a car stopping by the side of the road via a device associated with the car (e.g., an WI system, a smart phone, etc.). For example, the IVI system may report the position (e.g., location) and/or status (e.g., parked, utilizing hazard lights) to a server (e.g., cloud-computing server, etc.), wherein the information may be accessed and integrated with applications, services, devices, etc. to automatically alert cars approaching in the same direction. The alert may be utilized to automatically and/or manually avoid the hazard caused by the car. Accordingly, there may be no need to divert a driver's attention from the road to report the event, the event may be reported automatically to even a first approaching driver, and so on.

In addition, on-road dangerous events caused by moving objects, such as a cyclist, may be reported to approaching traffic that will encounter the moving object to avoid the hazard (e.g., even if dark, may divert the car to another path, change lanes, etc.). Moreover, it should be understood that any object causing a hazard on a road and capable of generating or providing road hazard data, such as a pedestrian having a smart phone and walking in the road, may automatically report the dangerous event to allow approaching traffic to avoid and/or prepare for the hazard (e.g., slow down).

Additional Notes and Examples:

Examples may include subject matter such as a method, means for performing acts of the method, at least one machine-readable medium including instructions that, when performed by a machine cause the machine to performs acts of the method, or an apparatus or system to communicate a road hazard according to embodiments and examples described herein.

Example 1 may include an apparatus having a data collector module to collect road hazard data for an object on a road, wherein the road hazard data is to include automatically generated data from a device associated with the object. The apparatus may include an interface module to provide the road hazard data, wherein an alert is to be generated based on the road hazard data to warn of a hazard by the object.

Example 2 may include the subject matter of Example 1 and further optionally may include, wherein the object is to include one or more of a vehicle at a side of a highway or a bicycle in a traveling lane of a street, wherein the road hazard data is to include object position data, and wherein the device is to include a mobile computing device of an object user.

Example 3 may include the subject matter of any of Example 1 to Example 2 and further optionally may include, wherein the device is to further include a hazard reporter module, the hazard reporter module including one or more of an image capture module to capture image data to be used to recognize an element of an image, a position module to determine a position of the object, or a hazard feature module to determine a utilization of a hazard feature of the object.

Example 4 may include the subject matter of any of Example 1 to Example 3 and further optionally may include, wherein the device is to further include a client module, the client module including one or more of a client map module to render a map merged with the road hazard data and navigation data, a client alert module to render the alert to a user or a client setting module to render an alert setting.

Example 5 may include the subject matter of any of Example 1 to Example 4 and further optionally may include a hazard service module, the hazard service module including one or more of an image recognition module to recognize an element of an image, a map service module to merge the road hazard data with a map, or a service alert module to generate the alert based on the road hazard data, wherein the alert is to appear on the map to warn at least approaching traffic of the hazard.

Example 6 may include the subject matter of any of Example 1 to Example 5 and further optionally may include, wherein the interface module is to include an application programming interface to allow a map service module to access the road hazard data to merge the road hazard data with a map, wherein the alert is to appear on the map to warn an approaching object user of the hazard.

Example 7 may include the subject matter of any of Example 1 to Example 6 and further optionally may include a display to render the alert, the display including one or more of a windshield display, an eye glass display, a touch screen display, a liquid crystal display, or a light emitting diode display.

Example 8 may include the subject matter of any of Example 1 to Example 7 and further optionally may include the alert is to cause an approaching object to one or more of manually avoid the hazard and automatically avoid the hazard.

Example 9 may include at least one computer-readable medium comprising one or more instructions that when executed on a computing device cause the computing device to collect road hazard data for an object on a road, wherein the road hazard data is to include automatically generated data from a device associated with the object, or provide the road hazard data, wherein an alert is to be generated based on the road hazard data to warn of a hazard by the object.

Example 10 may include the subject matter of Example 9 and further optionally may include, wherein the object is to include one or more of a vehicle at a side of a highway or a bicycle in a traveling lane of a street, wherein the road hazard data is to include object position data, and wherein the device is to include a mobile computing device of an object user.

Example 11 may include the subject matter of any of Example 9 to Example 10 and further optionally may include to capture image data to be used to recognize an element of an image, determine a position of the object, and determine a utilization of a hazard feature of the object.

Example 12 may include the subject matter of any of Example 9 to Example 11 and further optionally may include to render a map merged with the road hazard data and navigation data, render the alert to a user, and render an alert setting.

Example 13 may include the subject matter of any of Example 9 to Example 12 and further optionally may include to recognize an element of an image, merge the road hazard data with a map, and generate the alert based on the road hazard data, wherein the alert is to appear on the map to warn an approaching object user of the hazard.

Example 14 may include the subject matter of any of Example 9 to Example 12 and further optionally may include to provide an application programming interface to allow a map service to access the road hazard data to integrate the road hazard data with a map, wherein the alert is to appear on the map to warn at least approaching traffic of the hazard.

Example 15 may include the subject matter of any of Example 9 to Example 14 and further optionally may include to render the alert on a display.

Example 16 may include the subject matter of any of Example 9 to Example 15 and further optionally may include to one of more of manually avoid the hazard or automatically avoid the hazard.

Example 17 may include a method to communicate a road hazard, comprising collecting road hazard data for an object on a road, wherein the road hazard data includes automatically generated data from a device associated with the object, and providing the road hazard data, wherein an alert is to be generated based on the road hazard data to warn of a hazard by the object.

Example 18 may include the subject matter of Example 17 and further optionally may include, wherein the object includes one or more of a vehicle at a side of a highway or a bicycle in a traveling lane of a street, wherein the road hazard data includes object position data, and wherein the device includes a mobile computing device of an object user.

Example 19 may include the subject matter of any of Example 17 to Example 18 and further optionally may include capturing image data used to recognize an element of an image, determining a position of the object, and/or determining a utilization of a hazard feature of the object.

Example 20 may include the subject matter of any of Example 17 to Example 19 and further optionally may include rendering a map merged with the hazard data and navigation data, rendering the alert to a user, and/or rendering an alert setting.

Example 21 may include the subject matter of any of Example 17 to Example 22 and further optionally may include recognizing an element of an image, merging the road hazard data with a map, and/or generating the alert based on the hazard data, wherein the alert appears on the map to warn an approaching object user of the hazard.

Example 22 may include the subject matter of any of Example 17 to Example 23 and further optionally may include providing an application programming interface to allow a map service to access the road hazard data to merge the road hazard data with a map, wherein the alert appears on the map to warn at least approaching traffic of the hazard.

Example 23 may include the subject matter of any of Example 17 to Example 24 and further optionally may include rendering the alert on a display.

Example 24 may include the subject matter of any of Example 17 to Example 25 and further optionally may include manually avoiding the hazard, and/or automatically avoiding the hazard.

Example 25 may include at least one computer-readable medium including one or more instructions that when executed on one or more computing devices causes the one or more computing devices to perform the method of any of Example 17 to Example 24.

Example 26 may include an apparatus including means for performing the method of any of Example 17 to Example 24.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments may be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carry the meaning of "one or more" or "at least one". In addition, as used in this application and in the claims, a list of items joined by the terms "one or more of" and "at least one of" can mean any combination of the listed terms. For example, the phrases "one or more of A, B or C" can mean A; B; C; A and B; A and C; B and C; or A, B and C.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, the specification, and following claims.

We claim:

1. A system, comprising:
    a server, including:
        one or more processors;
        a network interface circuitry to communicate information to a client device; and
        at least one non-transitory storage device that includes machine-readable instructions that, when executed by the server, result in operations that include:
            identifying, by the one or more processors, hazard information indicative of one or more road hazards based on sensor data from one or more sensors on a first vehicle remote from the server, the hazard information indicating that the first vehicle represents the one or more hazards to other vehicles sharing a driving environment with the first vehicle;
            identifying, by the one or more processors, location information associated with the one or more road hazards from the one or more sensors on the first vehicle;
            determining a distance between the one or more road hazards and a second vehicle remote from the server; and
            determining a notification time interval to push alert information indicative of the one or more road hazards to the second vehicle, the notification time interval being determined using the determined distance and speed information associated with the second vehicle; and
        pushing the alert information to the second vehicle during the determined notification time interval.

2. The system of claim 1, wherein the machine-readable instructions, when executed by the server, result in operations that include:
    causing a communication of map data that includes the alert information indicative of the one or more road hazards to the second vehicle based on the location information associated with the one or more road hazards and location information associated with the second vehicle.

3. The system of claim 2, wherein the one or more processors are configured to communicate the map data that includes the alert information indicative of the one or more road hazards to the second vehicle by transmitting the alert information to a map service that merges the alert information with the map data to provide the map data including the one or more road hazards to the second vehicle.

4. The system of claim 1, wherein the machine-readable instructions, when executed by the server, result in operations that include:
    identifying, by the one or more processors, additional hazard information indicative of one or more second road hazards based on sensor data from one or more sensors on the second vehicle;
    identifying, by the one or more processors, additional location information associated with the one or more second road hazards from a location sensor associated with the second vehicle: and
    causing a communication of additional alert information indicative of the one or more second road hazards to the first vehicle based on the location information associated with the one or more second road hazards and the location information associated with the first vehicle.

5. The system of claim 4, wherein the machine-readable instructions, when executed by the server, result in operations that include:
    causing a communication of map data that includes the additional alert information indicative of the one or more second road hazards to the first vehicle based on the location information associated with the one or more second road hazards and the location information associated with the first vehicle.

6. The system of claim 1, wherein the machine-readable instructions, when executed by the server, result in operations that include:
    identifying, based on sensor information from the one or more sensors on the first vehicle, the hazard information that includes information indicative of vehicle hazard warning lights.

7. The system of claim 1, wherein the notification time interval is a predetermined time elapsed from when the hazard information indicative of the one or more road hazards was identified, and wherein the notification time interval is calculated such that the alert information is rendered at the second vehicle based upon the determined distance and speed information associated with the second vehicle.

8. A method, comprising:

identifying, by one or more processors that are part of a server, hazard information indicative of one or more road hazards based on sensor data from one or more sensors on a first vehicle that is located remote from the server, the hazard information indicating that the first vehicle represents the one or more hazards to other vehicles sharing a driving environment with the first vehicle;

identifying, by the one or more processors, location information associated with the one or more road hazards from a location sensor associated with the first vehicle;

determining a distance between the one or more road hazards and a second vehicle that is located remote from the server:

determining a notification time interval to push alert information indicative of the one or more road hazards to the second vehicle, the notification time interval being determined using the determined distance and speed information associated with the second vehicle that is communicated to the server by the second vehicle; and pushing, by the one or more processors, the alert information to the second vehicle during the determined notification time interval.

9. The method of claim 8, wherein causing the communication of the alert information indicative of the one or more road hazards to the second vehicle includes:

causing, by the one or more processors, a communication of map data that includes the alert information indicative of the one or more road hazards to the second vehicle based on the location information associated with the one or more road hazards and location information associated with the second vehicle.

10. The method of claim 8, comprising:

identifying, by the one or more processors, additional hazard information indicative of one or more second road hazards based on sensor data from one or more sensors on the second vehicle;

identifying, by the one or more processors, additional location information associated with the one or more second road hazards from a location sensor associated with the second vehicle; and causing, by the one or more processors, a communication of additional alert information indicative of the one or more second road hazards to the first vehicle based on the location information associated with the one or more second road hazards and the location information associated with the first vehicle.

11. The method of claim 10, wherein causing the communication of the additional alert information indicative of the one or more second road hazards to the first vehicle includes:

causing, by the one or more processors, a communication of map data that includes the alert information indicative of the one or more second road hazards to the first vehicle based on the location information associated with the one or more second road hazards and the location information associated with the first vehicle.

12. The method of claim 8, wherein identifying the hazard information indicative of the one or more road hazards based on the sensor data from the one or more sensors on the first vehicle includes:

identifying the hazard information that includes alert information indicative of vehicle hazard warning lights.

13. At least one non-transitory storage device that includes machine-readable instructions that, when executed by a server, result in operations that include:

identifying hazard information indicative of one or more road hazards based on sensor data from one or more sensors on a first vehicle that is located remote from the server, the hazard information indicating that the first vehicle represents the one or more hazards to other vehicles sharing a driving environment with the first vehicle;

identifying location information associated with the one or more road hazards from a location sensor associated with the first vehicle;

determining a distance between the one or more road hazards and a second vehicle that is located remote from the server;

determining a notification time interval to push alert information indicative of the one or more road hazards to the second vehicle, the notification time interval being determined using the determined distance and speed information associated with the second vehicle that is communicated to the server by the second vehicle; and pushing the alert information to the second vehicle during the determined notification time interval.

14. The at least one non-transitory storage device of claim 13, wherein the instructions that cause the communication of the alert information indicative of the one or more road hazards to the second vehicle, result in operations that include:

causing a communication of map data that includes the alert information indicative of the one or more road hazards to the second vehicle based on the location information associated with the one or more road hazards and the location information associated with the second vehicle.

15. The at least one non-transitory storage device of claim 13, wherein the machine-readable instructions further result in server operations that include:

identifying additional hazard information indicative of one or more second road hazards based on sensor data from one or more sensors on the second vehicle;

identifying additional location information associated with the one or more second road hazards from a location sensor associated with the second vehicle; and causing a communication of additional alert information indicative of the one or more second road hazards to the first vehicle based on the location information associated with the one or more second road hazards and the location information associated with the first vehicle.

16. The at least one non-transitory storage device of claim 15, wherein the instructions that cause the communication of the additional alert information indicative of the one or more second road hazards to the first vehicle, result in operations that include:

causing a communication of map data that includes the additional alert information indicative of the one or more second road hazards to the first vehicle based on the location information associated with the one or more second road hazards and the location information associated with the first vehicle.

17. The at least one non-transitory storage device of claim 13, wherein the instructions that identify the hazard information indicative of the one or more road hazards based on the sensor data from the one or more sensors on the first vehicle, result in operations that include:
identifying, based on sensor information from the one or more sensors on the first vehicle, hazard information that includes alert information indicative of vehicle hazard warning lights.

18. A vehicle electronic system, comprising:
one or more sensors carried by a first vehicle;
one or more processors configured to receive sensor data from the one or more sensors;
network interface circuitry configured to bidirectionally communicate between the first vehicle and a remote server; and
at least one non-transitory storage device that includes one or more applications having machine-readable instructions that, when executed by the one or more processors, result in operations that include:
causing a communication of road hazard information indicative of one or more first road hazards based on the received sensor data that is sent to the remote server by the first vehicle, the hazard information indicating that the first vehicle represents the one or more hazards to other vehicles sharing a driving environment with the first vehicle;
causing a communication of location information associated with the one or more first road hazards based on data representative of a location of the first vehicle using a location sensor associated with the first vehicle that is sent to the remote server by the first vehicle;
receiving from the remote server, via the network interface circuitry, additional road hazard information indicative of one or more second road hazards based on sensor data from one or more sensors carried by a second vehicle, wherein the location of the first vehicle is approaching a second location associated with the one or more second road hazards;
determining a notification time interval to push alert information indicative of the one or more second road hazards to the first vehicle, the notification time interval being determined using the second location and speed information associated with the first vehicle communicated to the remote server by the first vehicle; and
pushing the alert information indicative of the one or more second hazards to the first vehicle during the determined notification time interval.

19. The vehicle electronic system of claim 18, further comprising:
one or more sensors coupled to the one or more processors.

20. The vehicle electronic system of claim 19, further comprising:
one or more output devices.

21. The vehicle electronic system of claim 20, wherein the one or more output devices comprise one or more display devices.

22. The vehicle electronic system of claim 21, wherein the machine-readable instructions, when executed by the one or more processors, result in operations that include:
causing the one or more display devices to output the alert information indicative of one or more second hazards.

23. The vehicle electronic system of claim 21, wherein the machine-readable instructions, when executed by the one or more processors, result in operations that include:
causing the one or more display devices to output map data that includes the alert information indicative of one or more second hazards.

24. At least one non-transitory storage device that includes machine-readable instructions that, when executed by a server, result in operations that include:
causing a communication, via network interface circuitry, from a first vehicle to the server the communication including (i) road hazard information indicative of one or more first road hazards based on sensor data from one or more sensors carried by the first vehicle, the hazard information indicating that the first vehicle represents the one or more hazards to other vehicles sharing a driving environment with the first vehicle, and (ii) location information associated with the one or more first road hazards based on data representative of a location of the first vehicle from a location sensor carried by the first vehicle;
receiving from the server, via the network interface circuitry, additional road hazard information indicative of one or more second road hazards based on sensor data from one or more sensors carried by a second vehicle, wherein the location of the first vehicle is approaching a second location associated with the one or more second road hazards;
determining a notification time interval to push alert information indicative of the one or more second road hazards to the first vehicle, the notification time interval determined using the second location, the location of the first vehicle, and speed associated with the first vehicle communicated to the remote server by the first vehicle; and
pushing the alert information indicative of the one or more second road hazards to the first vehicle during the determined notification time interval.

25. The at least one non-transitory storage device of claim 24, wherein the machine-readable instructions, when executed by the one or more processors, result in operations that include:
causing one or more display devices to output the additional road hazard information indicative of the one or more second road hazards.

26. The at least one non-transitory storage device of claim 24, wherein the machine-readable instructions, when executed by the one or more processors, result in operations that include:
causing one or more display devices to output map data that includes the additional road hazard information indicative of the one or more second road hazards.

27. A system, comprising:
means for causing a communication from a first vehicle to a server, the communication including:
road hazard information indicative of one or more first road hazards based on sensor data from one or more sensors carried by the first vehicle, the road hazard information indicating that the first vehicle represents the one or more hazards to other vehicles sharing a driving environment with the first vehicle; and
location information associated with the one or more first road hazards based on data representative of a location of the first vehicle from a location sensor associated carried by the first vehicle;

means for receiving from the server additional road hazard information indicative of one or more second road hazards based on sensor data from one or more sensors carried by a second vehicle, wherein a location of the first vehicle is approaching a second location associated with the one or more second road hazards;

means for determining a notification time interval to push alert information indicative of the one or more second road hazards to the first vehicle, the notification time interval determined using the second location, the location of the first vehicle, and speed information associated with the first vehicle that is communicated to the remote server by the first vehicle; and means for pushing the alert information indicative of the one or more second road hazards to the first vehicle during the determined notification time interval.

28. The system of claim 27, comprising:

means for displaying the additional road hazard information indicative of the one or more second road hazards.

29. The system of claim 27, comprising:

means for displaying map data that includes the additional road hazard information indicative of the one or more second road hazards.

\* \* \* \* \*